3,331,869
HALOGENATED PHLOROGLUCINOL CARBOXYLIC ACID

John W. Krueger, Cottage Grove, Wis., assignor to The Frederick Post Co., Chicago, Ill., a corporation of Illinois
No Drawing. Original application July 18, 1963, Ser. No. 296,114. Divided and this application May 16, 1966, Ser. No. 550,144
3 Claims. (Cl. 260—521)

This sole application is a division of a joint application Ser. No. 296,114, filed July 18, 1963.

The present invention relates to chemical compounds and the production thereof, which are useful in light-sensitive compositions for producing diazotypes, and in particular, to such compositions which may be developed by application of heat.

In said Ser. No. 296,114, there are described and claimed diazotype compositions which are developable by heat, in which the agent leading to coupling is a new compound, namely, 3,5 - diX - phloroglucinol carboxylic acid, in which X is chlorine or bromine.

The said agent is new and useful for thermally developable diazotype compositions. The agent is also described in application Ser. No. 296,113, also filed July 18, 1963, of which said application Ser. No. 296,114 is a species.

Heretofore, it has been the general practice to produce diazotype compositions by combining a light-sensitive diazonium salt and a coupler therefor, in an environment in which the two are non-reactive, commonly an acidic environment, and then to change the environment to one in which the desired coupling takes place, commonly by changing the acidic environment to an alkaline one.

Couplers are chosen from ring-substituted aromatic compounds in which the aromatic ring has an active unsubstituted position at which coupling takes place, and also from various compounds containing a keto-methylene group.

In said application Ser. No. 296,113 there is disclosed a large number of ring-substituted benzoic acids which do not couple in an acidic environment at normal temperatures below 60° C. Some have unsubstituted ring positions and others have no unsubstituted ring positions. The latter do not qualify as couplers under accepted definitions of couplers, but they lead to coupling by thermally decarboxylating the —COOH group in the presence of a diazonium salt with which it is inactive at temperatures below 60° C. All of said disclosed substituted benzoic acids similarly effect coupling during thermal decarboxylation. In said application Ser. No. 296,113 such substituted benzoic acids are designated "coupler precursors," since by decarboxylation they cease to be substituted benzoic acids and become a coupled component of a resulting azo dye.

Among the coupler precursors so disclosed are two compounds which heretofore were unknown and which can be used to form dense blue-black dyes most satisfactory for commercial diazotypes.

The coupler precursors of the present invention are 3,5-dihalogen phloroglucinol carboxylic acid, wherein the halogen is bromine in one case, and chlorine in a second case. These compounds are new and are made as follows:

*3,5-dichloro phloroglucinol carboxylic acid.*—34 gm. of anhydrous phloroglucinol carboxylic acid was suspended in 200 ml. of glacial acetic acid in a flask equipped with a reflux condenser, sealed stirrer and gas inlet tube. 28.5 gm. of chlorine was slowly metered in over a one-hour period, with cooling as necessary to keep the temperature below 25° C. On cooling to 16° C., the solid content was filtered off and lightly washed with glacial acetic acid, and dried. On melting the compound gas was evolved. The compound is new.

*3,5-dibromo phloroglucinol carboxylic acid.*—170 gm. of phloroglucinol carboxylic acid was suspended in 2,000 ml. of glacial acetic acid at 20° C. To this was added over a one-hour period a solution of 325 gm. of bromine in 650 ml. of glacial acetic acid with stirring. The temperature was kept below 30° C. by cooling as required. The product was filtered, washed with glacial acetic acid then with chloroform, and then dried. Yield: 258 gm. or 79%.

A sample recrystallized from solution in methanol by the addition of chloroform and chilling was analyzed for C, H and Br, and found to correspond to $C_7H_4O_5Br_2$.

Found: C, 25.96%; H, 1.22%; Br, 48.74%. Theory: C, 25.64%; H, 1.22%; Br, 48.68%.

The melting point is 186° C. to 192° C. with gas evolution depending on the rate of heating. This compound has been postulated, but efforts to prepare it have been without success (Monatshefte der Chemie, vol. 32, p. 77). Therefore, it was not heretofore known as a compound or as a coupler.

A fixed procedure is followed for the examples given hereinafter.

Paper is coated with a polyvinyl acetate emulsion and dried as a base for the agents employed. An alcoholic solution of the coupler precursor is applied to the coated paper and the alcohol evaporated. Then there is applied an aqueous sensitizing light-sensitive diazonium salt composition which is dried at a temperature not exceeding 60° C. No color is formed on drying. Then the paper is subjected to actinic light under a patterned transparency in the normal manner for diazo prints to provide a developable image on the paper. The light destroys the diazonium compound in the sensitized layer, leaving undecomposed sensitized material in the unexposed areas. The light printed sheet is then heated to a temperature in the range from 130° C. to 150° C. for 5 to 10 seconds, thus effecting a colored image.

The sizing solution is:
  Polyvinyl acetate emulsion (30% solids).

The precursor solution is:
  Precursor _____gram__   1
  Methanol _____ml___ 100

The sensitizing composition is:
  Water _____ml__  90
  Diazonium salt _____gram__   1
  Tartaric acid _____do____   1
  Polyvinyl acetate emulsion (45% solids) __ml__  10
  Saponin _____gram__ 0.1

*Example 1.*—In the above formulations the precursor is 3,5-dichloro phloroglucinol carboxylic acid and the diazonium salt is p-diazo diethylaniline zinc chloride double salt.

*Example 2.*—In Example 1, the precursor is changed to 3,5-dibromo phloroglucinol carboxylic acid.

The light-exposed papers of Examples 1 and 2 were developed by heating as detailed in Table I below. The precursors of the present invention, lacking an open ring position, are such as those skilled in the art would conclude are not capable of coupling. But, it was found that they couple with the diazonium compounds to form a dyestuff when heated, and that they develop a different color when an acidic environment is changed to an alkaline environment. Thus, by subjecting the exposed sheets to moist ammonia gas, a dye is formed which is of a different color than the dye formed by heating as set forth in Table I.

TABLE I

| Example | °C. | Seconds | Color with heat | Color with alkali |
|---|---|---|---|---|
| 1 | 150 | 5 | Dense blue-black | Wine-red. |
| 2 | 150 | 5 | ----do---- | Do. |

*Examples 3 and 4.*—The compositions and procedure used for Examples 1 and 2, omitting the tartaric acid, give substantially the same results as do Examples 1 and 2.

In Examples 1 and 2, the tartaric acid is representative of weak acids in common use in the diazotype field to assure stability and long shelf-life before exposure. The acidity of the precursor itself also performs this function.

The invention is not limited to the diazonium compound of Example 1 and 2. Colors are likewise produced by both thermal and alkali development, in the presence of other diazonium compounds used in the procedure given above. Table II lists diazonium compounds substituted as zinc chloride double salts, or as sulfate or as chloride.

TABLE II

As double salts:
  p-Diazo-N,N-dimethyl aniline
  p-Diazo-N-methyl-N-beta-hydroxy ethyl aniline
  p-Diazo-N-ethyl-N-beta-hydroxy ethyl aniline
  p-Diazo-N-ethyl-N-benzyl aniline
  p-Diazo-N-methyl-N-benzyl-o-anisidine
  p-Diazo-morpholino benzene
  p-Diazo-o-chloro-N,N-diethyl aniline
  p-Diazo-N-ethyl-o-toluidine
  p-Diazo-N,N-diethyl-m-toluidine
  p-Diazo-N,N-diethyl-m-phenetidine
  p-Diazo-N,N-diethyl-m-carboxy aniline
  p-Diazo-2,5-diethoxy morpholino benzene
  p-Diazo-2,5-dibutoxy morpholino benzene
  p-Diazo-N-benzoyl-2,5-diethoxyaniline
  p-Diazo-N-benzoyl-2,5-dibutoxy aniline
  p-Diazo-2,5-diethoxy-p-tolyl mercapto benzene As sulfate:
  p-Diazo-diphenylamine As the chloride:
  p-Diazo-2,5,4'-triethoxy diphenyl The reactive ingredients need not be intimately mixed but may be so applied in layers that they are in intimate association for reactive contact at the temperature of decarboxylation. It is to be understood that the paper base used in the foregoing examples is representative of any carrier base, since it takes no part in the reaction involved. Accordingly, the invention contemplates new coupler precursors useful in light-sensitive diazotype bodies, such as sheet material, which can be developed by heat.

Although the present invention is directed to the new compounds, which have a utility in forming azo dyes, as in the diazotype art, such utility is not intended to exclude other uses of the compounds.

I claim:
1. A new compound having the formula 3,5-diX-phloroglucinol carboxylic acid, wherein X is one member selected from the group consisting of chlorine and bromine.
2. A new compound having the formula 3,5-dichloro-phloroglucinol carboxylic acid.
3. A new compound having the formula 3,5-dibromo-phloroglucinol carboxylic acid.

References Cited

UNITED STATES PATENTS 3,140,180   7/1964   Fritz _____ 96—75

FOREIGN PATENTS 607,113   8/1948   Great Britain.

OTHER REFERENCES

Bietrix: Soc. Chim. France, 7 (1892).

LORRAINE A. WEINBERGER, *Primary Examiner.*

SIDNEY B. WILLIAMS, JR., *Assistant Examiner.*